United States Patent [19]

Rivin

[11] 4,184,380
[45] Jan. 22, 1980

[54] GEARS HAVING RESILIENT COATINGS

[76] Inventor: Evgeny I. Rivin, 1114 Pierre, Windsor, Ontario, Canada

[21] Appl. No.: 885,400

[22] Filed: Mar. 10, 1978

[51] Int. Cl.² ............................................ F16H 55/16
[52] U.S. Cl. ........................................ 74/461; 74/464
[58] Field of Search ............... 74/461, 243 R, 443, 74/462, 464, 409, 411, 440; 29/159.2

[56] References Cited

U.S. PATENT DOCUMENTS

| | | | |
|---|---|---|---|
| 1,393,886 | 10/1921 | Doty | 74/443 |
| 2,530,767 | 11/1950 | Hamill | 74/461 |
| 3,469,467 | 9/1969 | Seaman | 74/243 R |
| 3,469,468 | 9/1969 | Cozzarin et al. | 74/243 R |
| 3,602,058 | 8/1971 | Beddoe | 74/434 |
| 3,730,009 | 5/1973 | Mead et al. | 74/461 |
| 3,808,906 | 5/1974 | Bowers | 74/461 |

*Primary Examiner*—Benjamin Wyche
*Assistant Examiner*—Conrad Berman
*Attorney, Agent, or Firm*—Krass & Young

[57] ABSTRACT

A tooth gearing having a resilient coating affixed to the engaging surfaces of gear teeth, the coating having a thickness and coefficient of friction such that the sliding and external friction that would occur between gear teeth not having the coating is taken up by shear deformation of the coating.

13 Claims, 6 Drawing Figures

GEARS HAVING RESILIENT COATINGS

BACKGROUND OF THE INVENTION

1. Field of the Invention

This invention relates to toothed gears for mechanical power transmission and in particular, to rigid toothed gears having resilient coatings affixed to their engaging surfaces.

2. Description of the Prior Art

Gearing conventionally consists of rigid gears having rigid teeth, which transmit mechanical power by forces transmitted from th teeth of one gear to the teeth of a mating gear. As the gears rotate, the point of contact on any tooth moves from tip to root or from root to tip. This contact consists of both a rolling motion and a sliding motion, the sliding motion having a velocity which reverses direction as the point of contact crosses the meshing circle of the gear. The meshing circle is determined by the center distance of the gears and the numbers of teeth, but does not depend upon the geometry of the gears. The sliding motion between the teeth results in friction. The friction in turn causes noise and thermal expansion of the gear teeth. Therefore, to prevent binding of the gear teeth because of thermal expansion, the tooth thickness of at least one gear must be slightly smaller than the space between the teeth of the opposed mating gear.

These clearances between the teeth of mating gears are called "backlash". Backlash is defined as the difference between the space between the teeth of a first gear less the thickness of the teeth of the mating gear. Also contributing to the total backlash are inaccuracies in the machining and formation of the gears.

Because of the clearances between the teeth of the mating gears. The gear teeth engage on only one side of their profiles. Also, in most instances only one pair of teeth are engaged at any particular moment. Therefore, since only a fraction of the gear teeth surfaces are engaged at any one moment, the load capacity of the gearing is substantially reduced.

In order to reduce backlash and noise toothed gears can be made from relatively soft and deformable materials such as rubber. However, when a high load is applied to gear teeth made of rubber, the teeth distort and may distort to such an extent that the teeth of mating gears slip over one another without power transfer.

A solution to this distortion problem is disclosed by Beddoe in U.S. Pat. No. 3,602,058. Beddoe teaches a composite gearing wherein the load is transmitted by deformable teeth when the load is low and by an adjacent set of hard teeth when the load is high. However, this type of system still has the basic problem of friction between the engaging gear teeth as well as increased complexity.

A partial solution to the backlash problem is the use of spring loaded split gears. The springs reduce the effect of backlash by preloading the gears to reduce clearances between the engaging gear teeth. This solution, however, still has the problem of noise and friction.

Methods of reducing friction between engaging gear teeth include the use of lubricants and/or coatings on the gear teeth. Although those methods reduce friction between the engaging teeth, they do not eliminate it.

In many applications the reduction of noise is a critical factor. For example, the primary means of detection of submarines is an underwater acoustic method by which the sounds emitted from the various components of the vessel are detected. The major proportion of this sound is produced by the gearing used in submarine machinery. By eliminating or greatly reducing the intensity of this sound, detection can be avoided.

Prior methods of reducing noise include the use of resilient coatings affixed on the engaging surfaces of gear teeth. These coatings operate to dampen the vibrations caused by the sliding of gear teeth. However, these methods do not eliminate the main cause of noise, theremal expansion and wear, the sliding between engaging teeth.

SUMMARY OF THE INVENTION

This invention is directed to an improved form of toothed gears for mechanical power transmission. Broadly, the invention involves coating one or both engaging sides of the teeth of one or both rigid gears of a gear set with a resilient material having a thickness and coefficient of friction such that the sliding and external friction that would normally occur between gear teeth not having the coating is taken up by shear deformation of the coating. The proper thickness of the resilient coating is depending upon both the characteristics of the resilient coating and the total length of the theoretical sliding path between the engaging teeth, and is calculated to insure that the coating deforms a sufficient amount to take up the sliding motion.

This invention solves the problem of reduced power transmission since the clearances between engaging teeth are eliminated thereby allowing both profiles of each tooth to transmit power.

This invention also provides a toothed gearing having reduced noise, vibration and wear and reduced sensitivity to distortions in gear alignment.

This invention further allows the use of tooth gearing made from materials such as ferrous metals without the need for special surface treatment.

Other objectives, advantages and applications of the present invention will be made apparent from the following detailed description of the preferred embodiments of the invention.

DESCRIPTION OF THE PREFERRED EMBODIMENTS

Figure 1:
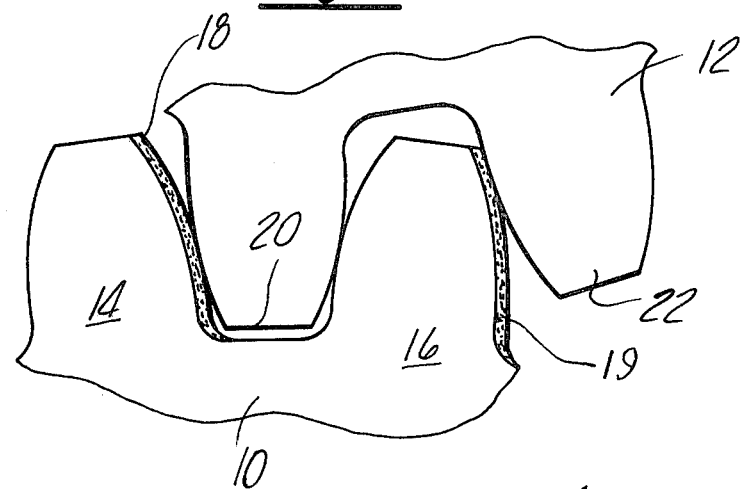
FIG. 1 illustrates a first embodiment of my invention wherein only one engaging surface of each tooth of one gear of two engaged gears is coated with a resilient material.

Referring to FIG. 1, a gear 10 rotates in a clockwise direction while a gear 12 rotates in a counter-clockwise direction. The right-hand engaging surface of each tooth of the gear 10, a pair of teeth 14 and 16 being representative, have a thin coating of resilient material, 18 and 19. The right-hand surfaces of the teeth 14 and 16 are engaged with a pair of teeth 20 and 22 respectively. The teeth of the gear 12 have no resilient coating applied to their engaging surfaces.

In operation during the rotation of the driven gear 12, the stem of the tooth 20 comes into contact with the coating 18. If the coating 18 were not present, the engagement process would include sliding as well as a rolling motion between the teeth 14 and 20. Because of the sliding a friction force develops, such force having a dirction opposite to the direction of the sliding velocity. If, however, the coating 18 is present and the coating is a resilient material such as rubber having a high coefficient of friction and a low shear modulus, the engagement process would cause a shear deformation of the coating which would take up the sliding. Since the force required for shear deformation of the coating 18 is proportional to its instantaneous shear deformation, upon initial contact between the tooth 20 and the coating 18 the force required to deform the coating 18 is small. Thus, starting from the initial contact between the tooth 20 and the coating 18, all of the sliding will be taken up, thereby preventing external friction between the engaging gear teeth.

The proper thickness of the coating 18 is dependent upon the total length of the theoretical sliding path between the teeth 14 and 20 and the premissible relative shear of the resilient coating. For example, for involute tooth gearing the length of the sliding path on one side of the mesh point, S in millimeters, is approximately equal to:

$$[25.4 \text{ millimeters} \times \text{teeth}^2/\text{inch}]/[4Z \, P_d \cos(\alpha)]$$

where Z is the number of teeth of each gear, $P_d$ is a diametral pitch in the gearing expressed in teeth per inch and $\alpha$ is the flank angle of the gearing.

The "maximum relative shear" is defined as a ratio of the length of the maximum permissible repetitive shear deformation of the coating without fatigue damage to the thickness of the coating. Therefore, the thickness of the coating should be equal to S/maximum relative shear.

Figure 2:
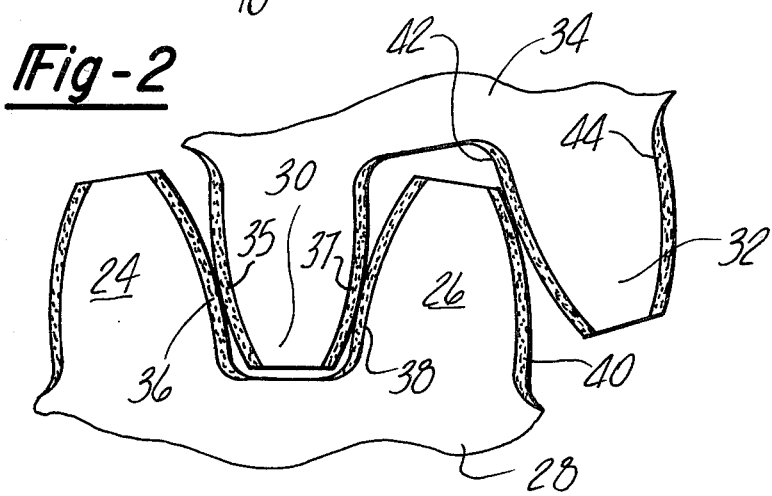
FIG. 2 illustrates a second embodiment of my invention wherein both engaging surfaces of each tooth of both gears are coated with a resilient material.

If the thickness of the coating is less than the ratio of the length of the sliding path of the maximum relative shear, the coating may be damaged by the action of the engaging teeth since the coating will exceed its deformation limit.

Where each engaging tooth is coated with resilient material as shown in FIG. 2, the thickness of each coating preferably should be one-half this magnitude. However, the total thickness of both coatings may be apportioned differently.

In further detail since a resilient material such as rubber is essentially a volumetrically incompressible material, the deformation under a compressive force should be compensated by a bulging of the rubber at its side (free) surfaces. When the thickness of a compressed rubber layer is substantially less than both the length and width of the layer, the surface area of the unconfined sides of the layer is small, thus limiting the bulging. Because of this limiting, the compression stiffness of such a layer increases much more quickly than its thickness decreases. Therefore, since shear deformation of a layer does not change its volume, and the shear stiffness of a layer is inversely proportional to its thickness, for thin layers of rubber the compression stiffness of such layers under a compressive load can increase to as high as 2000 to 3000 times the value of the shear stiffness. Thus, the permissible compressive load on a thin layer of rubber can be as high as 30,000 newtons/cm² thereby permitting the load carrying capacity of the tooth gearing to be very substantial.

Although the maximum compressive loads on the teeth of precision gears of the best steels can be higher than 30,000 newtons/cm², the load carrying capacity of such gears is reduced by inaccuracies in machining and assembly. These inaccuracies prevent the simultaneous engagement of more than one pair of teeth thus requiring that the entire load be transferred by only one pair.

The tooth gearing of FIG. 1 is not sensitive to these inaccuracies since the resilient coating has a relatively small angular stiffness. Therefore, if the inaccuracies are not very great, the load carrying capacity of each tooth is determined by its full width. Also since elastic deformation of the resilient coating operates to take up external friction, heat and noise generation is greatly reduced.

By coating both sides of all teeth of at least one gear, the tooth gearing may be preloaded by proper dimensioning of the interaxial distance between the gears. As shown in FIG. 2, where both sides of a pair of teeth 24 and 26 of a gear 28 and both sides of a pair of teeth 30 and 32 of a gear 34 are coated, there is no clearance between the gear teeth. A set of resilient coatings 35, 36, 37, 38, 40, 42 and 44 are preloaded in the stationary state. This preloading doubles the load carrying capacity of the gearing since both sides of each tooth of the gears 28 and 34 actively participate in the load transmission process.

As previously noted, if the length of the sliding path of the engaging teeth is large, the coating would need to be relatively thick. However, if the coating is thick the stiffness and load carrying capacity of the tooth gearing are drastically reduced. If the coating is too thin, the coating is unable to deform sufficiently without destruction of the coating, thus allowing sliding to occur.

Figure 3:
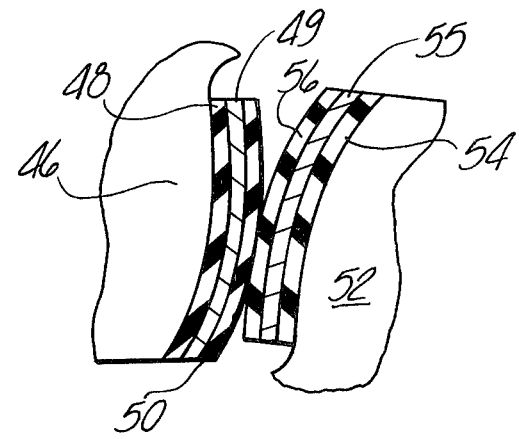
FIG. 3 illustrates a third embodiment of my invention wherein the coating on each gear tooth is multi-layered consisting of a stiff material sandwiched between two layers of a resilient material.

FIG. 3 shows a modification that solves this problem. In FIG. 3 the coating on a first gear tooth 46 consists of a layer 49 sandwiched between a pair of layers 48 and 50. The layers 48 and 50 are of a resilient material such as rubber, and the layer 49 is of metal or some other stiff material. The coating on a second gear tooth 52 consists of a layer 55 sandwiched between a pair of layers 54 and 56. As with the gear tooth 46, the layers 54 and 56 are of a resilient material such as rubber and the layer 55 is of metal or some other stiff material.

Since the shear deformation of a resilient material such as rubber does not alter its volume, its shear stiffness depends only on the dimensions of the resilient layer, but not on the presence or absence of any stiff layers in the planes of deformation. Therefore, the use of the layers 49 and 55 allows the reduction of the shear stiffness of the coating which is determined by the total thickness of resilient material in the coating without decreasing the load carrying capacity of the gearing which is determining by the thickness of each layer of the laminate.

Figure 4:
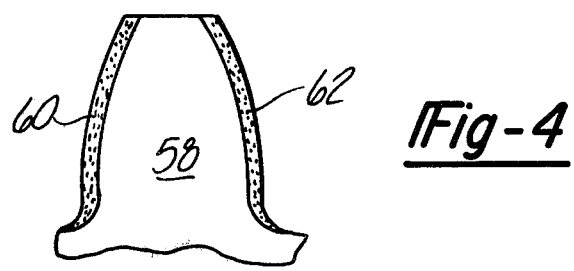
FIG. 4 illustrates a fourth embodiment of my invention wherein the coating on each gear tooth is of a first form variable thickness.

With conventional gearing, the stiffness of a gear changes during rotation since the stiffness of each gear tooth is a function of the distance between the tooth root and loading point (point of contact), which point is traveling along the tooth during the engagement process. This stiffness variation can cause intense noise and vibration within a gear assembly. Referring to FIG. 4, the stiffness of a tooth 58 increases in the direction from its tip toward its root. Also, since the stiffness of rubber decreases as its thickness increases, the stiffness of each of a pair of coatings 60 and 62 decreases in the direction toward the root of gear tooth 58. Therefore, by calculation or experimentation a constant total stiffness can be achieved by utilizing a variable thickness coating to compensate for the variable stiffness of the gear tooth.

Figure 5:
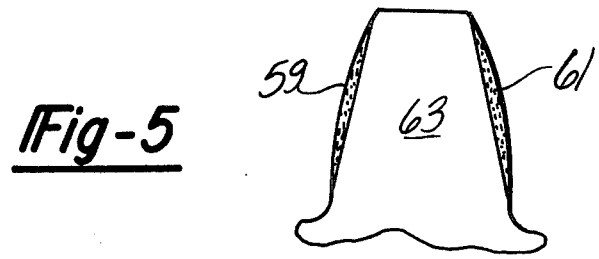
FIG. 5 illustrates a fifth embodiment of my invention wherein the coating on each gear tooth is of a second form of variable thickness.

FIG. 5 shows a second form of variable thickness coating. During the engagement process the shear deformation of the coating of each engaging tooth is at minimum (zero) at the root and tip of each tooth and is at a maximum near the middle of each tooth. Since the maximum permissible relative shear of the coating is directly proportional to the thickness of the coating, the coating can be thinner at those points where the shear deformations are less. Thus, since the magnitude of the shear deformation is at a maximum near the middle of the tooth and at a minimum at the tip and root of the tooth, the thickness of each of a pair of resilient coatings 59 and 61 or a tooth 63 may be variable, with a maximum thickness near the middle of the tooth and a minimum thickness at the tip and root of the tooth. One advantage of this arrangement is that each point of the coating deforms to its maximum permissible level thereby causing each portion of the coating to have equal fatigue stress.

Many other forms of variable thickness coatings are possible, each form being chosen for a specific result.

Figure 6:
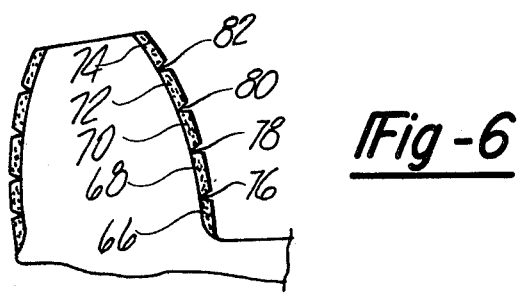
FIG. 6 illustrates a sixth embodiment of my invention wherein the coating on the gear tooth is divided into separate sections.

As previously stated, the load carrying capacity of tooth gearing increases as the thickness of the coating on the engaging surfaces of the gear teeth decreases. However, such a decrease is limited by the allowable shear deformation of the coating. In order to permit a thinner coating to be used, the coating can be segmented. In FIG. 6 one coating of tooth 64 consists of the segements 66, 68, 70, 72 and 74 separated by notches 76, 78, 80 and 82 respectively. Since each segment returns to its initial condition after its engagement process, the shear deformation of each segment is equal to only a portion of the sliding path. When the width of notches 76, 78, 80 and 82 is made equal to the maximum shear deformation of the corresponding sections, sections 66, 68, 70 and 72 respectively there is no gap between the sections during the engagement process. This modification to the coating can be adapted to the other variations embodied in FIGS. 1, 2, 3 and 4.

All the drawings show parts of round involute gears. It should be understood that the invention is fully applicable to racks, non-round gears, and non-involute gears such as Wildhaber-Novikov gears etc.

The invention has been described with reference to specific embodiments, and it is to be understood that although the embodiments represent the best made in practicing the invention known to the inventor at the time of filing the patent application, various modifications to the illustrated embodiments are possible and accordingly, the foregoing description is not to be construed in a limiting sense.

The embodiments of the invention in which an exclusive property or privilege is claimed are defined as follows:

1. A gearing system for transmitting mechanical power, comprising:
    first and second rigid gears supported in meshing engagement so that surfaces on at least one engaged pair of teeth oppose one another at any instant; and
    resilient means positioned between engaged teeth of a pair having such physical characteristics and thickness that the sliding components of motion of said teeth relative to one another cause a shear deformation of said resilient means sufficient to eliminate physical sliding motion between the engaged teeth.

2. The gearing system of claim 1 wherein the resilient means has a thickness substantially equal to the length of the sliding path of the engaged pairs of teeth divided by the maximum relative shear of the resilient means.

3. The gearing system of claim 2 wherein the gear teeth have an involute form and the length of the sliding path of the engaged pairs of teeth is substantially equal to

[25.4 millimeters $\times$ teeth$^2$/inch][4Z $P_d$ cosine $(\alpha)$]

where Z is the number of teeth of each gear, $P_d$ is the diametral pitch of the gearing expressed in teeth per inch, and $\alpha$ is the flank angle of the gearing.

4. The gearing system of claim 1 wherein the resilient means comprises an elastomer.

5. The gearing system of claim 1 wherein the resilient means comprises a plurality of independent coating sections with a separate coating affixed on an engaging surface of each tooth of one of said rigid gears, each said engaging surface being on the same side of each tooth of said gear.

6. The gearing system of claim 1 wherein the resilient means comprises a plurality of coatings with a separate coating affixed on each engaging surface of each tooth of the first rigid gear.

7. The gearing system of claim 1 wherein the resilient means comprises a plurality of coatings with a separate coating affixed on each engaging surface of each tooth of both the first rigid gear and the second rigid gear.

8. The gearing system of claim 1 wherein the resilient means is a coating formed of a layer of rigid material sandwiched between two layers of an elastomer.

9. The gearing system of claim 1 wherein the resilient means has a thickness which varies along the tooth profile.

10. The gearing system of claim 1 wherein the resilient means has a thickness which increases monotonously along the tooth profile toward the tooth root.

11. The gearing system of claim 1 wherein the resilient means has a thickness that increases from the root of the gear tooth to the center of the gear tooth and decreases from the center of the gear tooth to the tip of the gear tooth.

12. The gearing system of claim 1 wherein the resilient means is a coating formed of a plurality of segments.

13. The gearing system of claim 1 wherein the resilient means are positively bonded to the surfaces of said teeth.

* * * * *

UNITED STATES PATENT AND TRADEMARK OFFICE
CERTIFICATE OF CORRECTION

PATENT NO. : 4,184,380
DATED : January 22, 1980
INVENTOR(S) : Evgeny I. Rivin

It is certified that error appears in the above-identified patent and that said Letters Patent are hereby corrected as shown below:

The equation appearing at Column 3, line 40 and at Column 6, line 24 should read as follows:

$$[25.4 \text{ millimeters} \times \pi^2/\text{inch}]/[4Z\ P_d \text{cosine}(\alpha)]$$

Signed and Sealed this

Twenty-sixth Day of May 1981

[SEAL]

*Attest:*

RENE D. TEGTMEYER

*Attesting Officer*   *Acting Commissioner of Patents and Trademarks*